(12) United States Patent
Qi et al.

(10) Patent No.: US 8,777,286 B2
(45) Date of Patent: Jul. 15, 2014

(54) UNPACKING DEVICE FOR GLASS SUBSTRATE

(75) Inventors: Minghu Qi, Guandong (CN); Chun Hao Wu, Guandong (CN); Kun Hsien Lin, Guandong (CN); Yongqiang Wang, Guandong (CN); XiandeGuo Li, Guandong (CN); Zhenhua Guo, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 117 days.

(21) Appl. No.: 13/518,860

(22) PCT Filed: May 24, 2012

(86) PCT No.: PCT/CN2012/075981
§ 371 (c)(1),
(2), (4) Date: Jun. 22, 2012

(87) PCT Pub. No.: WO2013/159418
PCT Pub. Date: Oct. 31, 2013

(65) Prior Publication Data
US 2013/0285402 A1    Oct. 31, 2013

(51) Int. Cl.
*B25J 15/06* (2006.01)
(52) U.S. Cl.
USPC .......................... 294/185; 414/752.1
(58) Field of Classification Search
USPC ............... 294/185, 64.2, 65, 87.1, 907, 183; 414/752.1, 776, 783; 901/40, 46; 269/21
See application file for complete search history.

(56) References Cited

U.S. PATENT DOCUMENTS

| 5,953,812 | A  | * | 9/1999  | Ferrante ........................ 29/714 |
| 6,065,789 | A  | * | 5/2000  | Nagai et al. ................... 294/185 |
| 6,979,032 | B2 | * | 12/2005 | Damhuis ......................... 294/65 |
| 7,261,350 | B2 | * | 8/2007  | Isetani et al. ................. 294/185 |
| 7,628,434 | B2 | * | 12/2009 | Bruce et al. .................... 294/65 |
| 2011/0243676 | A1 | * | 10/2011 | Marguet et al. ............ 408/72 R |

* cited by examiner

*Primary Examiner* — Stephen Vu
(74) *Attorney, Agent, or Firm* — Andrew C. Cheng

(57) ABSTRACT

The present invention provides an unpacking device for glass substrate and which includes a bracket and a plurality of sucking heads mounted thereon. A plurality of altitude sensors is incorporated to trigger an alarm if the altitude sensors are not synchronized during the pickup operation.

6 Claims, 2 Drawing Sheets

UNPACKING DEVICE FOR GLASS SUBSTRATE

FIELD OF THE INVENTION

The present invention relates to a technology of manufacturing of liquid crystal display device, and more particularly to an unpacking device used to unpack a plurality of glass substrates of the LCD device and its partitions.

DESCRIPTION OF PRIOR ART

The liquid crystal display device features low radiation, slim and compact, and lower energy consumption, and it has been widely applied on mobile phone, personal digital assistant, notebook computer, personal computer and television.

During the manufacturing of the liquid crystal display device, an automatic unpacking device will be used. As shown in FIG. 1, a robot arm of the automatic unpacking device (not shown in FIG. 1) will pickup a partition firstly, and then a glass substrate 12 (not shown in FIG. 1) with its sucking nozzle from a storage box 13. Normally, the glass substrate 12 are disposed under the partition within the storage box 13, and because the flatness of both the glass substrate 12 and the partition, there is almost a vacuum therebetween. As a result, once the partition is sucked by the sucking nozzle, the glass substrate 12 is also picked up. Because the glass substrate 12 is not really sucked by the sucking nozzle, the glass substrate is merely lifted and dropped obliquely within the box 13. As a result, once the robot arm descends into the box to pickup the glass substrate 12, the sucking nozzle will directly hit head to head to the obliquely disposed glass substrate 12. Not only will it damage the glass substrate, but also will damage the sucking nozzle as well.

SUMMARY OF THE INVENTION

It is the main objective of the present invention to provide a technical solution to the unpacking of the glass substrate encountered by the prior art.

In order to resolve the prior art issues, the present invention provides an unpacking device for glass substrate, and which including a bracket and a plurality of sucking heads mounted thereon, and a plurality of altitude sensors. The sucking heads are used to pickup a working target, and the altitude sensors are arranged between the bracket and the sucking heads. The unpacking device of the present invention can readily reduce the breakage of the glass substrates and also protect the sucking heads from being damaged.

According to one of the preferred embodiment of the present invention, wherein each of the sucking heads includes a guiding post, a spring member, and a sucking end at lower end, an end of the guiding post is interlinked to the altitude sensor, and the other end interlinks to the sucking end, the spring member is sleeved onto the guiding post, and is located between the altitude sensor and the sucking end.

According to one of the preferred embodiment of the present invention, wherein each of the sucking heads has a same distance to the bracket.

According to one of the preferred embodiment of the present invention, wherein when the spring member is naturally uncompressed, the corresponding altitude sensor is set to a turned-off position, and when the spring member is compressed, the altitude sensor is triggered to a turned-on position.

According to one of the preferred embodiment of the present invention, wherein when all the altitude sensors are turned on simultaneously during the descending of the sucking heads toward a working target, it represents a normal working position.

According to one of the preferred embodiment of the present invention, wherein when any one of the altitude sensors is turned on asynchronically with others during the descending of the sucking heads toward a working target, it represents a abnormal working position, the sucking heads will stop descending immediately.

According to one of the preferred embodiment of the present invention, the unpacking device further comprises an alarm device which will be triggered to sound when an abnormal condition is encountered.

According to one of the preferred embodiment of the present invention, wherein the altitude sensors are equipped with a timer, wherein within the preset time period, an asynchronization within the altitude sensors can be ignored, and wherein when an asynchronization within the altitude sensors keeps on after the preset time period, then a determination of asynchronization is incurred between the sucking heads.

According to one of the preferred embodiment of the present invention, wherein the sucking end is a sucking disk.

According to one of the preferred embodiment of the present invention, wherein the number of the sucking heads is selected from any one of two, three and four.

In order to resolve the prior art issues, the present invention provides an unpacking device for glass substrate, and which including a bracket and a plurality of sucking heads mounted thereon, and a plurality of altitude sensors. The sucking heads are used to pickup a working target, and the altitude sensors are arranged between the bracket and the sucking heads. Wherein each of the sucking heads includes a guiding post, a spring member, and a sucking end at lower end, an end of the guiding post is interlinked to the altitude sensor, and the other end interlinks to the sucking end, the spring member is sleeved onto the guiding post, and is located between the altitude sensor and the sucking end. Wherein when the spring member is naturally uncompressed, the corresponding altitude sensor is set to a turned-off position, and when the spring member is compressed, the altitude sensor is triggered to a turned-on position. Wherein when any one of the altitude sensors is turned on asynchronically with others during the descending of the sucking heads toward a working target, it represents an abnormal working position, the sucking heads will stop descending immediately.

In order to resolve the prior art issues, the present invention provides an unpacking device for glass substrate, and which including a bracket and a plurality of sucking heads mounted thereon, and a plurality of altitude sensors. The sucking heads are used to pickup a working target, and the altitude sensors are arranged between the bracket and the sucking heads. Wherein each of the sucking heads includes a guiding post, a spring member, and a sucking end, at lower end, an end of the guiding post is interlinked to the altitude sensor, and the other end interlinks to the sucking end, the spring member is sleeved onto the guiding post, and is located between the altitude sensor and the sticking end. Wherein when the spring member is naturally uncompressed, the corresponding altitude sensor is set to a turned-off position, and when the spring member is compressed, the altitude sensor is triggered to a turned-on position. Wherein each of the sucking heads has a same distance to the bracket.

The unpacking device of the present invention can readily reduce the breakage of the glass substrates and also protect the sucking heads from being damaged.

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings. Wherein.

Figure 1:
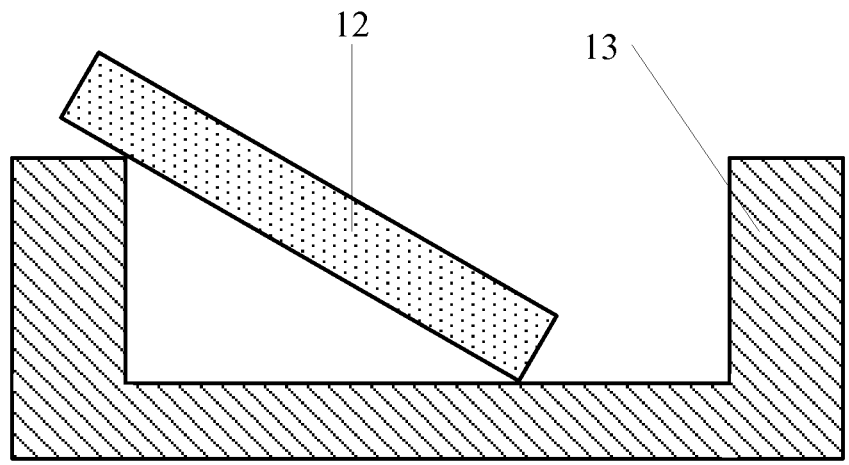
FIG. 1 is an illustrational view showing a prior art glass substrate is obliquely disposed within a storage box.

In order clearly explain the technology of the embodiment illustrated in the present invention, a brief and concise description will be given along with the accompanied drawings. Apparently, the embodiments illustrated in the drawings are merely some typical embodiments and which can be readily modified by the skilled in the art without any additional laborious efforts so as to transform them into other drawings.

Figure 2:
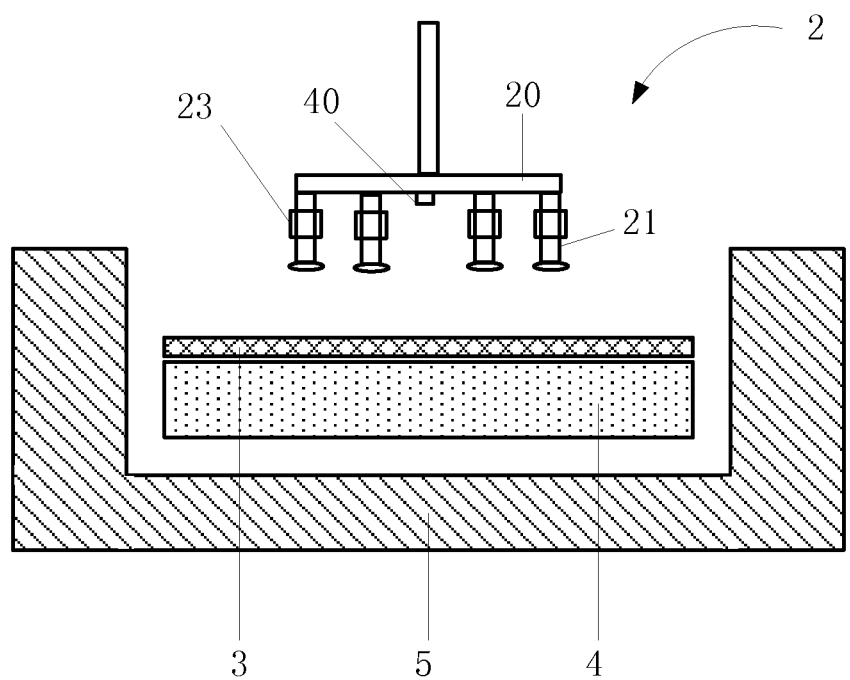
FIG. 2 is an illustrational view showing a unpacking device made in according with the present invention is under working status.

The present invention publishes and provides an unpacking device for glass substrate. Please referring to FIG. 2, the unpacking device 2 can be used to retrieve a partition 3, and a glass substrate 4 from a storage box 5. For example, the partition 3 can be firstly retrieved and then disposed within another storage box (not shown) for later usage. Afterword, the glass substrate 4 is retrieved for further processing in different workstations. In general, both the glass substrate 4 and the partition 3 are disposed horizontally within the storage box 5. The partition 3 is disposed upon the glass substrate 4. Since they are stacked together in a face-to-face manner, the gap therebetween is too small and it even may create a vacuum therebetween.

The unpacking device 2 includes a bracket 20, and a plurality of sucking heads 21 arranged on the bracket 20, and a plurality of altitude sensor 23. The altitude sensors 23 are each disposed between the bracket 20 and the sucking head 21.

Figure 3:
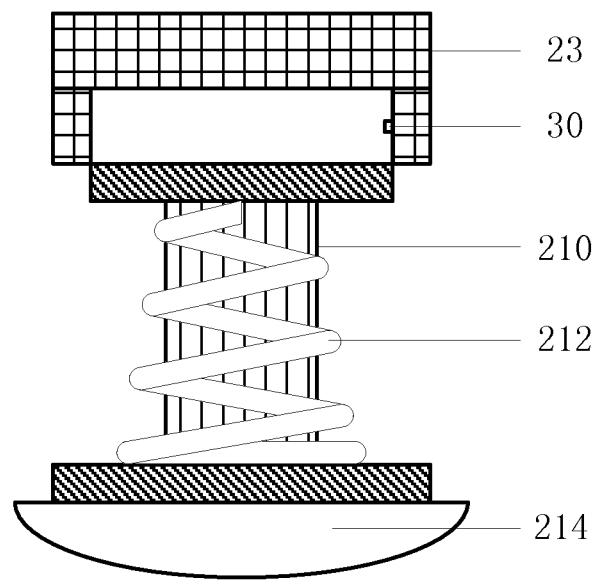
FIG. 3 is an enlarged view of an altitude sensor in accordance with the present invention shown in FIG. 2.

The sucking heads 21 are used to hold on a working target, such as the glass substrate 4 and the partition 3, through the sucking force. Referring to FIG. 3, the sucking head 21 includes a guiding post 210, a spring member 212, and a sucking end 214. An end of the guiding post 210 is interconnected to the altitude sensor 23, and the other end is interconnected to the sucking end 214. The spring member 212 is enveloped onto the guiding post 210 and located between the sucking end 214 and the altitude sensor 23. In the current embodiment, a distance of each of the plurality of sucking ends 214 to the bracket 20 equals to each other. The sucking end 214 is embodied as a sucking disk or nozzle. The material used to make the sucking end 214 or the nozzle can be selected from different resources depending on its field application. Preferably, a sucking end 214 with strong sucking force is provided to serve the purpose.

When the spring member 212 is under natural status, or fully extended without any external force, the altitude sensor 23 is set to a turned-off status or position. Once when the spring member 212 is compressed as external force applied thereto, then the altitude sensor 23 is set to a turned-on statue.

When the sucking ends 214 descend toward the working target, if all the altitude sensors 23 are working simultaneously or synchronically, it represents that the working target is correctly placed, and the unpacking device 2 can properly conduct its intended working cycle.

If during its descending displacement of the sucking ends 214 toward the working target, one of the altitude sensor 23 is asynchronically triggered on with respect to the rest of the altitude sensors 23, for example, one of the sensor 23 is triggered on, and the rest of the altitude sensors 23 are still remained in turned-off position. Then an abnormal working condition is detected and identified. In this situation, the sucking ends 214 will stop immediately toward the working target. Meanwhile, an alarm unit 40 is incorporated within the unpacking device 2, and once the abnormal condition is encountered, an alarm will be triggered so as to advise the technician to resolve the abnormal condition in time.

The unpacking device 2 is further provided with a debug function. A timer 30 is provided to allow a certain time window to check the synchronization of the altitude sensors 23. Within the allowed time period, even there is an asynchronization between the altitude sensors 23, the system will just ignore it and no alarm will be triggered. For example, within the allowed time period, one of the altitude sensors 23 is triggered on, while the rest altitude sensors 23 are remained turned-off, then the system will still identify this is a normal working condition, and allow the sucking heads 20 keep descending to pick up the glass substrate 4 stored within the storage box 5 so as to compensate the difference of touchdown of each of the sucking ends 214 onto the glass substrate 4. However, if this asynchronization among the altitude sensors 23 keeps on, then an abnormal working condition is identified. That means that after the given time period, one or two of the altitude sensors 23 are kept in triggered on condition, while the rest of the altitude sensors 23 are kept in turned-off condition. Then there is a very high possibility that the unpacking device 2 faces an abnormal working condition. The descending displacement of the sucking ends 214 has to stop immediately so as to protect both the glass substrate 4 and the sucking ends 214.

In the current embodiment, the number of the sucking heads 21 is four (4), which can be readily placed on four corners of the working target. Of course, the number of the sucking heads 21 can be only two (2), and can be readily placed on a symmetrical position along a central line. In other alternative, the number of the sucking heads 21 can be three (3), and can be readily placed onto the working target in a triangular manner. Actually, the number of the sucking heads 21 can be six (6), eight (8) or any other suitable number.

When the unpacking device 2 is used to unpack the partition 3 and the glass substrate 4, the sucking ends 214 will be firstly placed over the surface of the partition 3, and then lift it up. If the glass substrate 4 is remained within the storage box 5, then the unpacking device 2 will repeat its operation to pick up the glass substrate 4.

Figure 4:
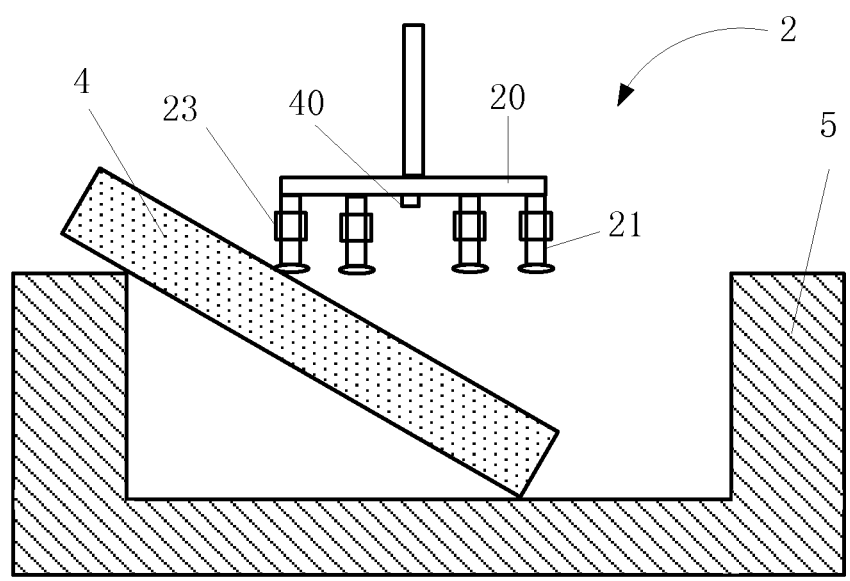
FIG. 4 is an illustrational view showing the unpacking device stops working once one of the altitude sensor is triggered while the others are not when an obliquely disposed glass substrate is encountered.

Another situation is that during the ascending displacement of the sucking ends 214, the glass substrate 4 is pickup also along with the partition 3 resulted from a vacuum situation therebetween. Since the coupling between the partition 3 and the partition 4 is not strong enough to bring the glass substrate 4 all the way up, and the glass substrate 4 will eventually be altered from its originally horizontal position, and randomly disposed within the storage box 5, for example, in an oblique manner such as shown in FIG. 4. In this case, the sucking ends 214 which has already picked and placed the partition 3 to other storage box 5 is returning back to the storage box 5 again and is ready to pick up the glass substrate 4 which is supposed to be horizontally placed. While the sucking ends 214 are going downward, since the glass substrate 4 is obliquely disposed within the storage box 5, and each of the sucking ends 214 reaches to the glass substrate 4 is asynchronical. When one of the sucking ends 214 which faces the highest point of the glass substrate 4 has already reached to the glass substrate 4, as a result, with the compression of the spring member 212, the corresponding altitude sensor 23 is triggered accordingly. According to the design of the unpacking device 23, the rest of the sucking ends 214 are sill in the air, and therefore their corresponding altitude sensors 23 are still kept in the turned-off condition. That means that there is an asynchronization among the altitude sensors 23, and this has been prolonged and exceeded the time window allowed by the system. In this situation, the sucking ends 214 will stop descending immediately, and triggering an alarm to advice the technician. Even the glass substrate 4 is obliquely disposed within the storage box 5, since there is an asynchronization among the altitude sensors 23, and this asynchronization exceeds the allowable time window, the sucking ends 214 are therefore stopped from keeping on descending. This immediate measurement will protect both the glass substrate 4 and the sucking ends 214 from physical damages.

The unpacking device 2 can be used to other proper applications, for example a substrate made from other material, other than picking up the glass substrate 4.

As compared to the existing prior art, the unpacking device made in accordance with the present invention can be concluded with the following advantages. The unpacking device includes a plurality of sucking heads each incorporated with an altitude sensor. As a result, by identifying a synchronization or asynchronization among the altitude sensors, the glass substrate disposed within the storage box can be identified whether it is placed horizontally or obliquely. As a result, an immediate measurement can be taken so as to stop the descending of the sucking heads once an abnormal condition of the glass substrate is encountered.

In conclusion, the unpacking device made in accordance with the present invention effectively reduce the damage of the substrate and also protect the unpacking device from being damaged.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. An unpacking device for glass substrate, including a bracket and a plurality of sucking heads mounted thereon, wherein the unpacking device is incorporated with a plurality of altitude sensors arranged between the sucking heads and the bracket;

wherein each of the sucking heads includes a guiding post, a spring member, and a sucking end at a lower end, an end of the guiding post is interlinked to the altitude sensor, and another end of the guiding post interlinks to the sucking end, the spring member is sleeved onto the guiding post, and is located between the altitude sensor and the sucking end;

wherein when the spring member is naturally uncompressed, the corresponding altitude sensor is set to a turned-off position, and when the spring member is compressed, the altitude sensor is triggered to a turned-on position wherein when any one of the altitude sensors is turned on asynchronically with other sensors during the descending of the sucking heads toward a working target, it represents an abnormal working position, the sucking heads will stop descend immediately; and wherein further comprises an alarm device which will be triggered to sound when an abnormal condition is encountered.

2. The unpacking device as recited in claim 1, wherein each of the sucking heads has a same distance to the bracket.

3. The unpacking device as recited in claim 1, wherein when all the altitude sensors are turned on simultaneously during the descending of the sucking heads toward a working target, it represents a normal working position.

4. The unpacking device as recited in claim 1, wherein the altitude sensors are equipped with a timer, wherein within the preset time period, an asynchronization within the altitude sensors can be ignored, and wherein when an asynchronization within the altitude sensors keeps on after the preset time period, then a determination of asynchronization is incurred between the sucking heads.

5. The unpacking device as recited in claim 1, wherein the sucking end is a sucking disk.

6. A unpacking device for glass substrate, including a bracket and a plurality of sucking heads mounted thereon, wherein the unpacking device is incorporated with a plurality of altitude sensors arranged between the sucking heads and the bracket, wherein each of the sucking heads includes a guiding post, a spring member, and a sucking end at a lower disk, an end of the guiding post is interlinked to the altitude sensor, and an other end interlinks to the sucking end, the spring member is sleeved onto the guiding post, and is located between the altitude sensor and the sucking end, wherein when the spring member is naturally uncompressed, the corresponding altitude sensor is set to a turned-off position, and when the spring member is compressed, the altitude sensor is triggered to a turned-on position, wherein when any one of the altitude sensors is turned on asynchronically with other sensors during the descending of the sucking heads toward a working target, it represents an abnormal working position, the sucking heads will stop descending immediately; and wherein further comprises an alarm device which will be triggered to sound when an abnormal condition is encountered.

* * * * *